US008782294B1

(12) United States Patent
Diewald et al.

(10) Patent No.: US 8,782,294 B1
(45) Date of Patent: Jul. 15, 2014

(54) INTRA-PROCESSOR RESOURCE CONTROL

(71) Applicant: Texas Instruments Deutschland GmbH, Freising (DE)

(72) Inventors: Horst Diewald, Freising (DE); Johann Zipperer, Unterschleissheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/917,805

(22) Filed: Jun. 14, 2013

(51) Int. Cl.
G06F 3/06 (2006.01)
G06F 13/12 (2006.01)

(52) U.S. Cl.
CPC .................................. *G06F 3/06* (2013.01)
USPC ............. 710/5; 710/2; 710/8; 710/15; 710/32

(58) Field of Classification Search
None
See application file for complete search history.

(56) References Cited

U.S. PATENT DOCUMENTS

2008/0091867 A1* 4/2008 Plondke et al. ............... 710/261

* cited by examiner

*Primary Examiner* — Scott Sun
(74) *Attorney, Agent, or Firm* — John R. Pessetto; Frederick J. Telecky, Jr.

(57) ABSTRACT

A processor and execution units providing intra-processor resource control. A processor includes a processor core and a peripheral. The processor core includes a first execution unit, and a second execution unit coupled to the first execution unit. The peripheral is coupled to the second execution unit. The second execution unit is configured to execute a complex instruction, and includes a status register and resource control logic. The status register includes a resource control field configured to store resource control information. The resource control information specifies whether the second execution unit requests access to the peripheral during execution of an instruction stream comprising a complex instruction. The resource control logic is configured to apply the resource control information to request access to the peripheral during execution of the instruction stream comprising the complex instruction.

22 Claims, 6 Drawing Sheets

INTRA-PROCESSOR RESOURCE CONTROL

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution units providing novel intra-processor resource control are disclosed herein. In one embodiment, a processor includes a processor core and a peripheral. The processor core includes a first execution unit, and a second execution unit coupled to the first execution unit. The peripheral is coupled to the second execution unit. The second execution unit is configured to execute a complex instruction, and includes a status register and resource control logic. The status register includes a resource control field configured to store resource control information. The resource control information specifies whether the second execution unit requests access to the peripheral during execution of an instruction sequence including a complex instruction. The resource control logic is configured to apply the resource control information to request access to the peripheral during execution of the instruction sequence.

In another embodiment, a processor includes a processor core and one or more peripherals. The processor core includes a first execution unit, and a second execution unit coupled to the first execution unit. The peripherals are coupled to the first execution unit and the second execution unit. The second execution unit is configured to execute a complex instruction, instruction sequences, and to provide a plurality of concurrently active processing chains. Each of the processing chains includes execution of an instruction sequence including a complex processing instruction. The second execution unit is also configured, for each of the processing chains, to initiate, in conjunction with execution of the complex processing instruction, allocation of at least one of the peripherals for use by the processing chain.

In a further embodiment, a processor includes a processor core and one or more peripherals. The processor core includes a first execution unit, and a second execution unit. The peripherals are coupled to the first execution unit and the second execution unit. The second execution unit comprises a status register and resource control logic. The status register includes a resource control field configured to store resource control information. The resource control information specifies whether the second execution unit requests access to the peripheral. The second execution unit is configured to execute a complex processing instruction, and to provide a plurality of concurrently active processing chains. Each of the processing chains includes execution of an instruction sequence including a complex processing instruction. The resource control logic is configured, for each of the processing chains, to initiate, in conjunction with execution of the complex processing instruction, and based on the resource control information, allocation of at least one of the peripherals for use by the signal processing chain.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
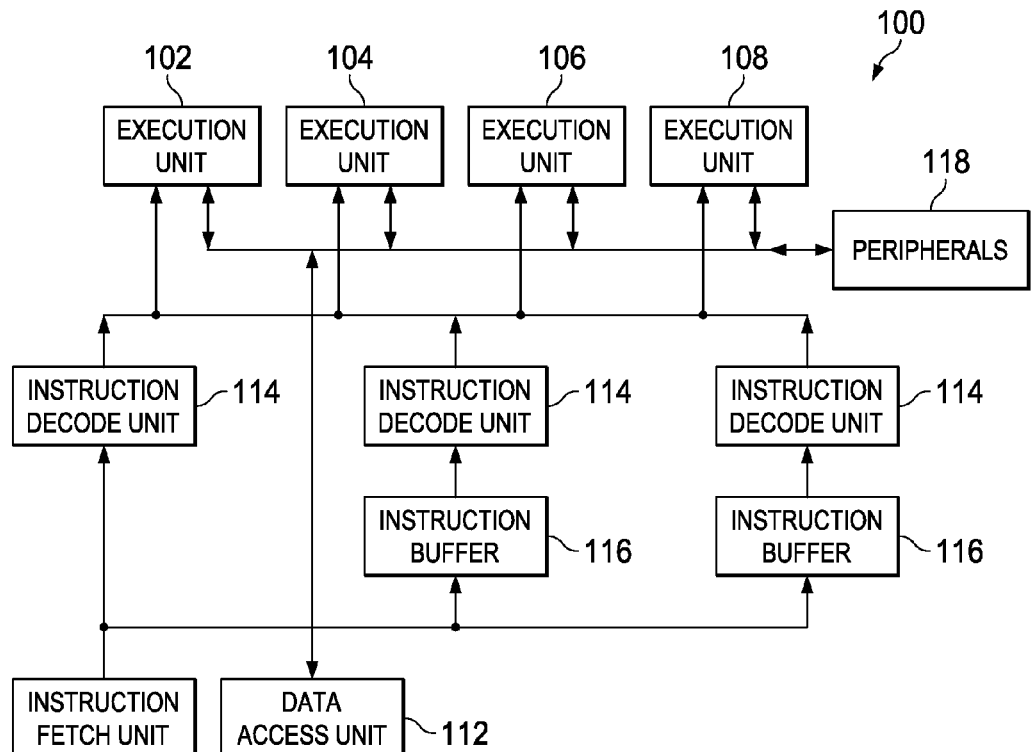
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Further, the term "processing chain" refers to data or signal processing sequence implemented in an execution unit. A processing chain may apply sequence of one or more complex instructions, and/or a mix of complex and non-complex instructions. Operation of a processing chain may also set, control, and/or modify the hardware used to implement the processing chain.

Further, the term "software" includes any executable code capable of running on a processor, regardless of the media used to store the software. Thus, code stored in memory (e.g., non-volatile memory), and sometimes referred to as "embedded firmware," is included within the definition of software.

The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In conventional processor architectures, desired functionality is provided by execution of instructions arranged in accordance with that functionality. For example, to control a peripheral device as part of a processing sequence, a conventional processor may execute a series of instructions that move values to and/or from the peripheral, assert control signals to the peripheral, etc. While effectively providing needed functionality, execution of instructions specifically to implement control functionality consumes power and/or storage resources that may be limited in some processor applications (e.g., embedded microcontroller applications). Additionally, in some conventional processor architectures, execution of instructions needed to control a peripheral may be restricted to a specified execution unit which reduces overall performance.

Embodiments of the processors disclosed herein include execution units that are capable of providing control to peripherals, other execution units, and various devices in the processor based on resource control information stored in the execution unit rather than by execution of instructions directed to providing the control functionality. Circuitry in the execution units and/or external to the execution units may generate control signals based on the resource control information that directs the operation of intra-processor resources in conjunction with instruction execution. For example, in embodiments of the processors disclosed herein, an execution unit may execute a complex instruction that processes data over many cycles. A complex instruction applicable to the processors disclosed herein may provide mathematical functionality (such as evaluation of trigonometric functions, root functions, etc.), signal processing functions, statistical functions, logical functions, financial computations, encryption/decryption, etc.

The data processed by a complex instruction may be provided by a peripheral that requires control from the execution unit. The execution unit may provide the needed control during execution of the complex instruction based on resource control information stored in the execution unit. By providing intra-processor resource control via such resource control information, embodiments reduce the number of instructions executed to support control operations, and thereby reduce processor power consumption and/or instruction storage requirements, and provide improved overall performance.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. In some embodiments of the processor 100, the execution units 102-108 may be components of a single processor core. Some embodiments of the processor 100 also include peripherals 118. The peripherals 118 may include components that operate in conjunction with the execution units to perform a processing operation. For example, the peripherals 118 may include data storage resources, such as random access memory, communication components, timers, analog-to-digital converters, clock generators, debug logic, voltage references, resource management, etc.

One or more of the execution units 102-108 can execute a complex instruction. For example, an execution unit 102-108 may be configured to execute a fast Fourier transform (FFT), execute a finite impulse response (FIR) filter, solve a trigonometric function, evaluate a polynomial, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may be stalled until the execution unit 104 has produced the required result. One execution unit, e.g., a primary execution unit, may provide instructions to, or otherwise control the instruction execution sequence of, other execution units.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated to one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions and/or instruction sequences stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each or some execution unit 102-108 is configured to control access to the resources of the processor 100 needed by the execution unit to execute an instruction. For example, each execution unit 102-108 can allocate and control a resource, such as a peripheral device, for use by the execution unit. Such allocation and control can include requesting exclusive or shared access to a peripheral, controlling peripheral device power modes and timing, etc. Execution unit resource control also extends to software resources and other execution units or portions thereof. Thus, each execution unit 102-108 is able to independently control access to resources of the processor 100 (power, clock frequency, etc.) internal or external to the execution unit needed to execute instructions, and to operate independently from other components of the processor 100.

To improve processing efficiency, the execution units 102-108 of the processor 100 store and apply resource control information to control resources of the processor 100. Various forms of resource control information may be applied to control the operation of peripherals 118 and other hardware and/or software resources of the processor 100. By implementing control via resource control information, embodiments can provide autonomous signal chain processing using a single instruction (or a small number of instructions) to implement complex functionality. Accordingly, the number of instructions stored, and the power consumed in instruction movement and execution may be reduced in various embodiments of the processor 100.

In some embodiments of the processor 100, one or more conductors form a bus connecting the execution units 102-108 to the peripherals 118 and other allocatable resources of the processor 100. Such an allocation bus may transfer allocation information in the processor 100 where the allocation information includes an identifier specifying one or more resources to be allocated for use by an execution unit, parameters or resource operation, etc.

Figure 2:
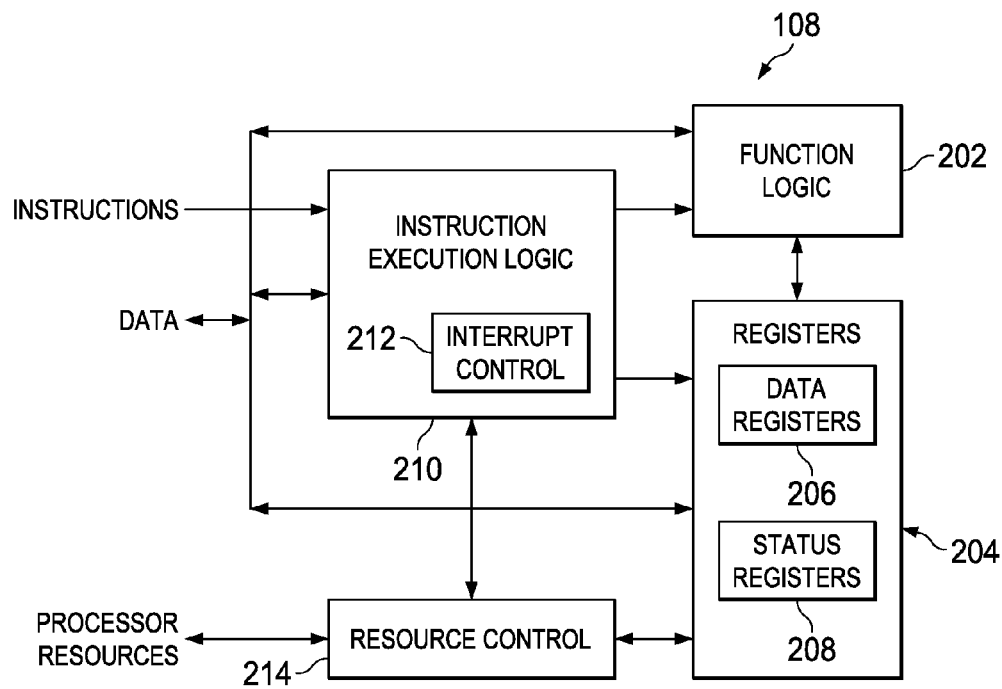
FIG. 2 shows a block diagram of an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202 and/or the registers store pointer data to the operands and/or a mix of operand data and pointers. The number and/or size of registers included in the data registers 206 may vary across embodiments. For example, one embodiment may include 16 16-bit data registers, and another embodiment may include a different number and/or width of registers. The status registers 208 include one or more registers that store state/status information produced by operations performed by the execution unit 108, such as function logic 202, and/or store instruction execution and/or execution unit state information. State information stored in a status register 208 may include a zero result indicator, a carry indicator, result sign indicator, overflow indicator, interrupt enable indicator. The state information also includes instruction execution state not recorded in conventional processor architectures. Instruction execution state reflects the current state or progress of execution of an instruction. Instruction execution state may be saved as part of interrupt service initiation and restored as part of interrupt service termination. During instruction execution, the progress and correct execution of an instruction can be verified by inspection of the instruction execution state via a debug environment.

More specifically, a status register 208 may store resource control information. The resource control information may be applied by the execution unit 108 to allocate and control various processor resources, such as peripherals 118, other execution units or portions thereof, software resources, etc. The resource control information may be provided to the execution unit 108 via a field of an instruction currently being executed by the execution or a field of an instruction previously executed by the execution unit 108. The resource control information may also be provided to the execution unit 108 at manufacture for use with a given instruction, provided by another execution unit at run-time, etc. Because the status registers 208 are preserved (e.g., by movement to memory or other registers) during service of an interrupt, the resource control information stored in or accessed via the status registers 208 may be saved with the status register 208 at interrupt service initiation and restored at interrupt service completion thereby preserving the resource control information across interrupts. The resource control information stored in a status register 208 may specify resource identity, resource allocation/deallocation timing, resource allocation duration, resource operational parameters, resource allocation/deallocation conditions, etc. In some embodiments, resource control information may be indirectly referenced via a status register 208. For example, a pointer or index value stored in a status register 208 may indicate the location of resource control information to be applied by the execution unit 108.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108.

The instruction execution logic 210 includes interrupt control logic 212 that allows complex instructions executing in the execution unit 108 to be interrupted. The interrupt control logic 212 detects conditions, such as an interrupt event or reception of an instruction to be executed, that dictate interruption of a currently executing complex instruction. Responsive to detection of such a condition, the interrupt control logic 212 may cause the instruction execution logic 210 to suspend execution of the complex instruction and store in the registers 204, or other storage resource (e.g., a memory), information indicative of the state of the execution unit 108 at the point of suspension of execution (e.g., status register values, relevant data values, instruction execution sequence information, etc.). When the complex instruction execution state information has been saved, the instruction execution logic 210 sequences the execution unit 108 through the operations of a first interrupt service instruction, and any subsequent interrupt service instructions. On completion of the interrupt service, the instruction execution logic 210 restores the saved complex instruction execution state information to the registers 204 and the instruction execution logic 210, and resumes execution of the interrupted complex instruction.

The execution unit 108 also includes resource control logic 214. The resource control logic 214 applies resource control information to allocate and control the various resources (e.g., storage, peripherals, etc.) of the processor 100 that the execution unit 108 applies during instruction execution. By allowing independent allocation and control of processor resources by each execution unit 102-108, the power consumed by the processor 100 may be reduced by placing only components of the processor 100 required for instruction execution by an active execution unit 102-108 in an active power state.

The resource control logic 214 may apply the resource control information in conjunction with other status/data values from registers 204 and instruction state information provided by the instruction execution logic 210 to assert control to peripherals 118, and/or other resources based on instruction execution state timing. In some embodiments, the resource control logic 216 may include state machines or other control structures to sequence control signaling based on the resource control information.

Resources allocated by the resource control logic 214 can include software resources in addition to peripherals devices and other hardware resources. The resource control logic 214 may control allocation of software resources via interrupts, task switching hardware, etc. that make a software resource available to the execution unit. For example, the resource control logic 214 can allocate interrupt execution via interrupt enable controls, thereby restricting an associated interrupt service to operation only when a related operational condition is met.

Figure 3:
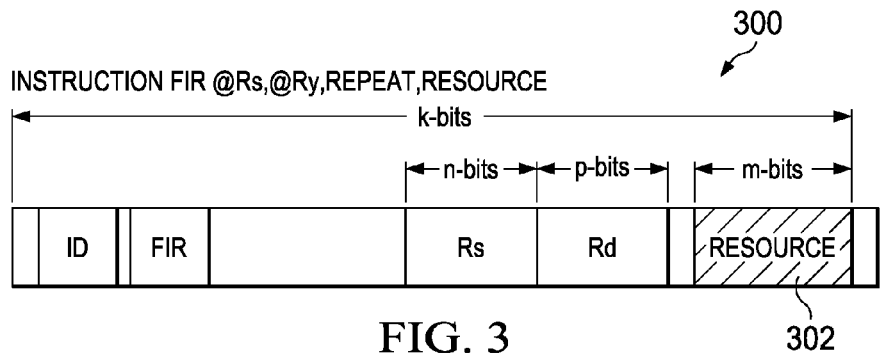
FIG. 3 shows an instruction that includes a field specifying resource control information in accordance with various embodiments.

FIG. 3 shows an instruction 300 executable by at least one of the execution units of the processor 100. The instruction 300 includes a Resource field 302 specifying resource control information in accordance with various embodiments. Information provided in the Resource field 302 may directly or indirectly (e.g., via pointer) specify resource control information. Some embodiments of the instruction 300 may include more than one Resource field 302 where each Resource field 302 may be directed to allocation and/or control of a resource (execution unit, peripheral, etc.) of the processor 100. The resource control information contained in the Resource field 302 may transferred to a resource control field of a status register 208 in the execution unit that executes the instruction 300. The instruction 300 may perform a function other than transfer of resource control information. For example, the instruction 300 may be a FIR instruction that includes resource control information applied by the resource control logic 214 to allocate and/or control a peripheral during execution of the FIR instruction.

Figure 4:
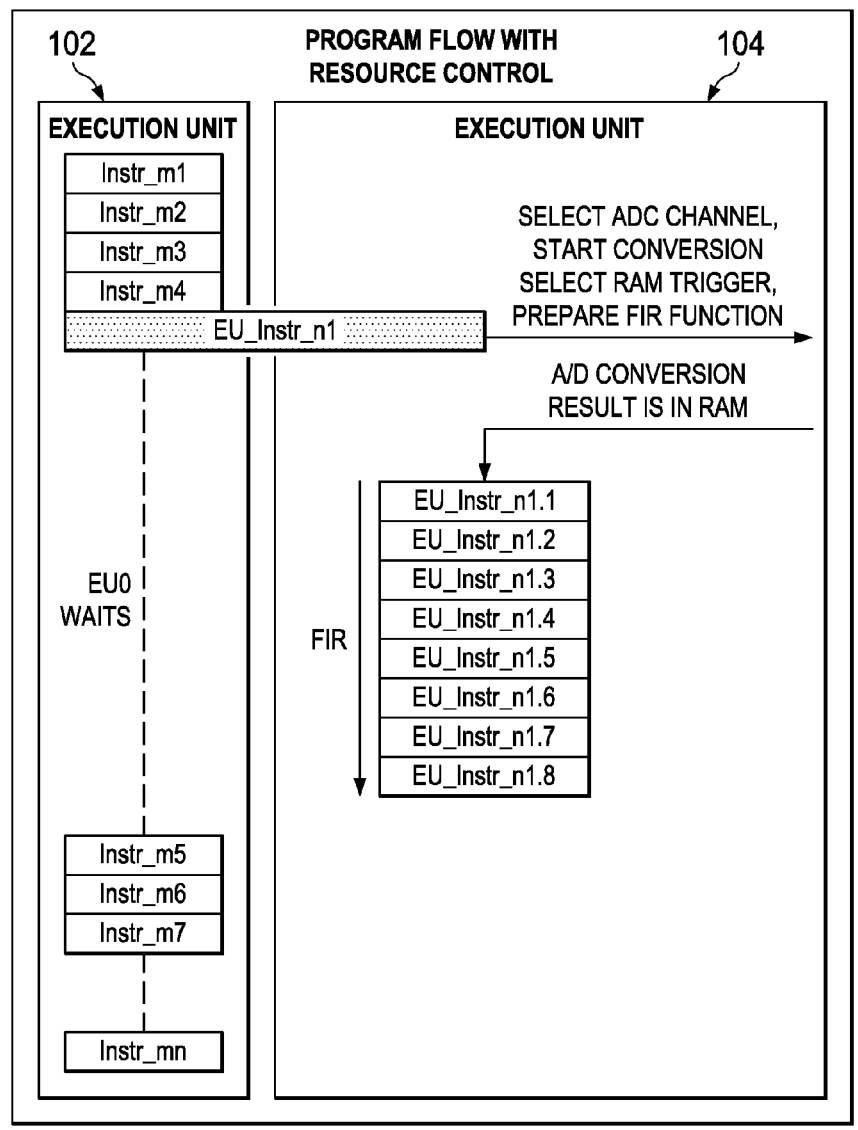
FIG. 4 shows an example of an execution unit applying resource control information while executing a complex instruction in accordance with various embodiments.

FIG. 4 shows an example of an execution unit applying resource control information while executing a complex instruction in accordance with various embodiments. In FIG. 4, instructions Instr_m1 to Instr_m4 are fetched and executed by execution unit (EU) 102, which may be the principal execution unit of the processor 100. Instruction EU_Instr_n1 is fetched next and directed to EU 104 for execution. EU 104 may be a secondary execution unit of the processor 100. EU_Instr_n1 is a complex instruction that provides FIR filtering functionality when executed. Instruction EU_Instr_n1 may include a Resource field 302 that directly or indirectly provides resource control information. Alternatively, resource control information for use with instruction EU_Instr_n1 may have been previously provided to EU 104 for use with the FIR instruction. The resource control information may specify parameters of A/D conversion (channel, reference source/voltage, sample timing, etc.), sample buffering, DMA control, etc. The resource control information or a reference thereto may be stored in a status register 208 as described herein.

The resource control logic 214 of the execution unit 104 generates signals requesting allocation of peripherals needed to support execution of the instruction EU_Instr_n1 in accordance with resource control information. Similarly, the resource control logic 214 generates signals for controlling the operation of the allocated peripherals and passes control information and parameters needed for operation to the allocated peripherals.

Execution of the instruction EU_Instr_n1 is suspended while the A/D converter, DMA channel, etc. operate as programmed by the resource control logic 214 to acquire samples for FIR processing. When the required samples have been collected, EU 104 is triggered to resume execution of the instruction EU_Instr_n1, and sequences through execution states EU_Instr_n1.1 to EU_Instr_n1.8 to apply FIR filtering to the acquired samples. In similar fashion, EU 104 may execute a sequence of preloaded instructions responsive to resource trigger events. For example, in FIG. 4, if an FFT instruction had been issued in addition to the FIR instruction, then EU 104 could execute both the FIR and the FFT responsive to a number of data samples being stored in memory. Such resumption of execution may be triggered by the A/D converter, the memory, a timer, etc.

With completion of execution state EU_Instr_n1.8, execution of instruction EU_Instr_n1 may be suspended and instruction execution by EU 102 resumed. EU 104 may generate a trigger signal (e.g., an interrupt) that causes EU 102 to resume execution. EU 104 may execute any number of iterations of the FIR operations. While in FIG. 4, execution of instructions by EU 102 is suspended while EU 104 executes instruction EU_Instr_n1, in some embodiments, EU 102 may execution instructions concurrent with execution of EU_Instr_n1 by EU 104.

Figure 5:
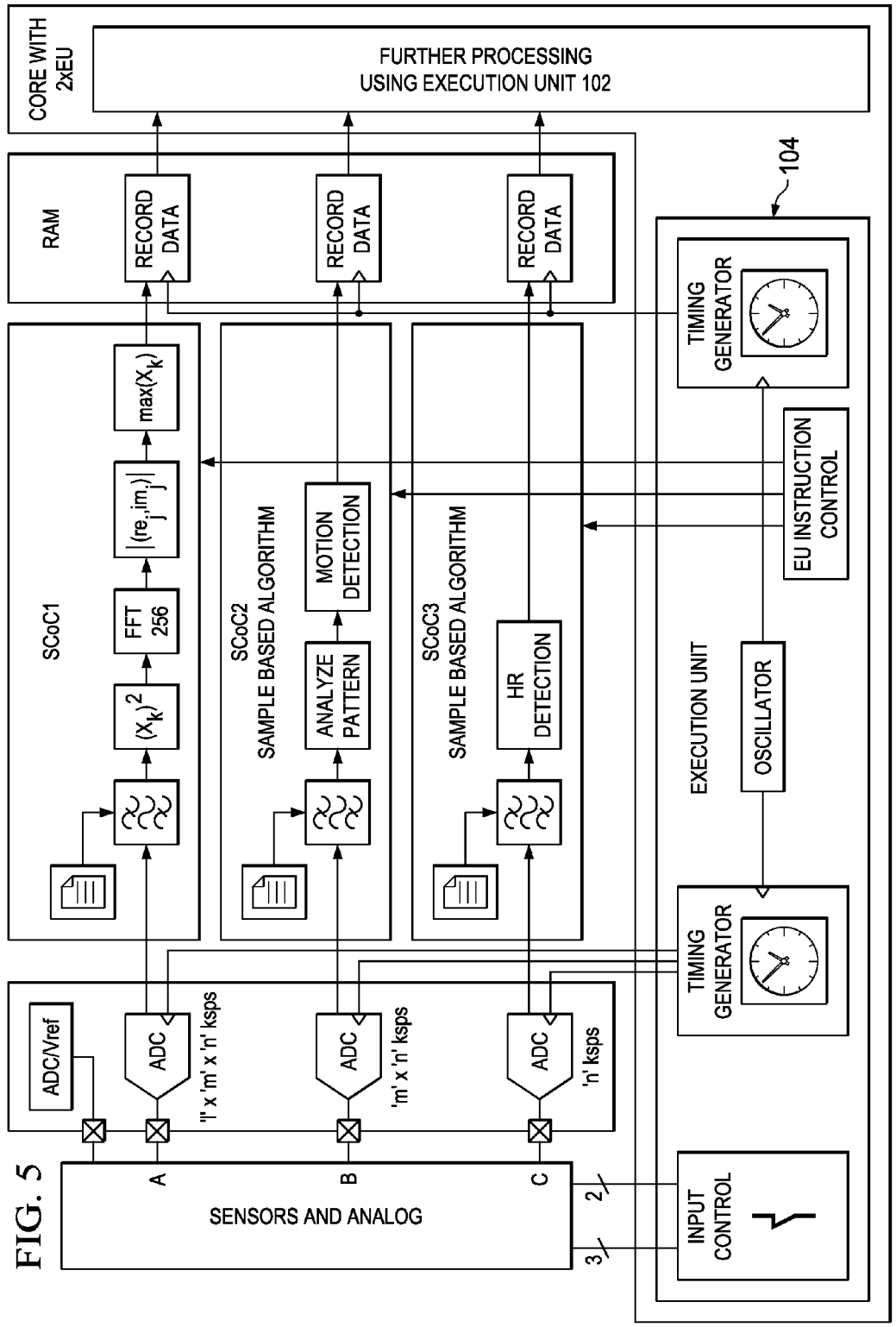
FIG. 5 shows an execution unit applying resource control information to implement a plurality of signal processing chains in accordance with various embodiments.

FIG. 5 shows an execution unit applying resource control information to implement a plurality of signal processing chains in accordance with various embodiments. In FIG. 5, the execution unit 104 is autonomously providing three concurrent signal chains SCoC1, SCoC2, and SCoC3, where each signal chain provides different signal processing functionality. Each signal chain is provided with data by a different A/D converter or A/D conversion channel of the processor 100. Outputs of signal chain are stored in memory for further processing by execution unit 102. The resource control logic 214 controls the allocation of the A/D converter, memory, timing, and other processor resources applied to implement the signal chains. The capability to autonomously control the peripherals needed to implement the signal chains SCoC1, SCoC2, and SCoC3 is advantageous in that other portions of the processor 100 can placed in a reduced power state with the execution unit 104 directly controls the power states of the signal chain resources.

Figure 6:
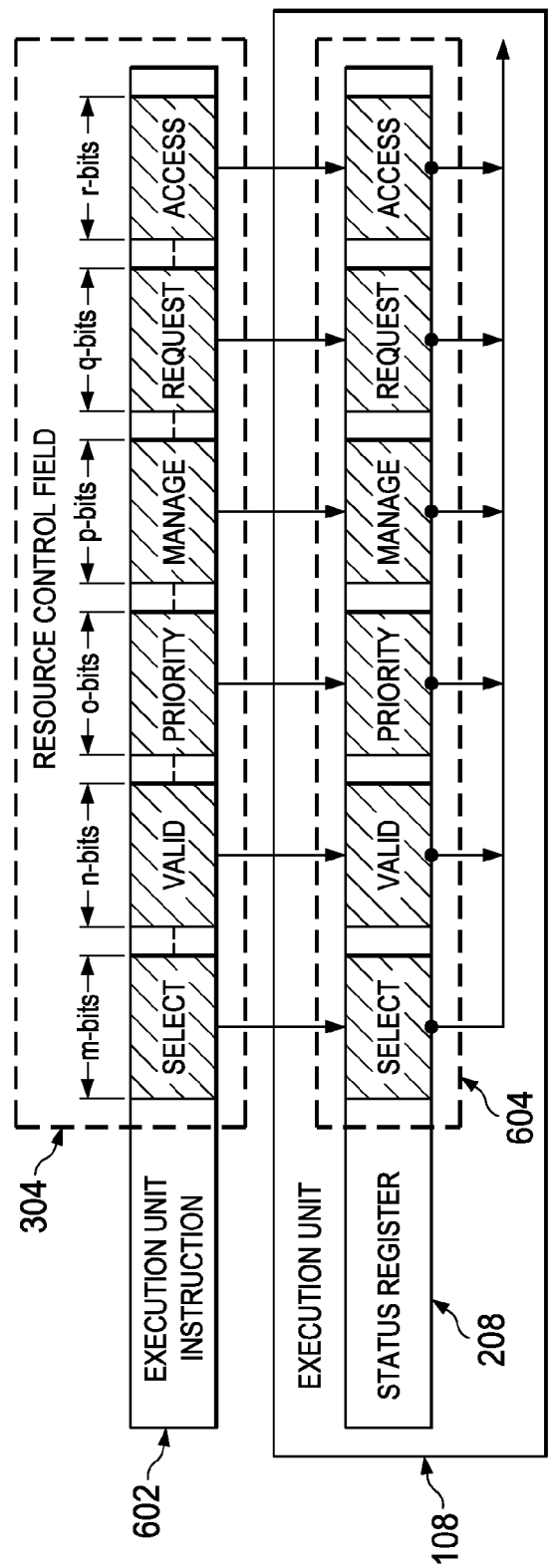
FIG. 6 shows transfer of resource control information from an instruction to a status register of an execution unit in accordance with various embodiments.

FIG. 6 shows transfer of resource control information from a Resource field 304 of an instruction 602 to a status register 208 of an execution unit 108 in accordance with various embodiments. The status register 208 includes a resource control field 604 into which the resource control information is transferred. The Resource field 304 may include any number of values for allocation and/or control of a resource. In some embodiments, the Resource field 304 may indirectly specify the resource control information. For example, the Resource field 304 may specify a location (via pointer or index) of resource control information to be copied into the resource control field 604 of the status register 208.

Figure 7:
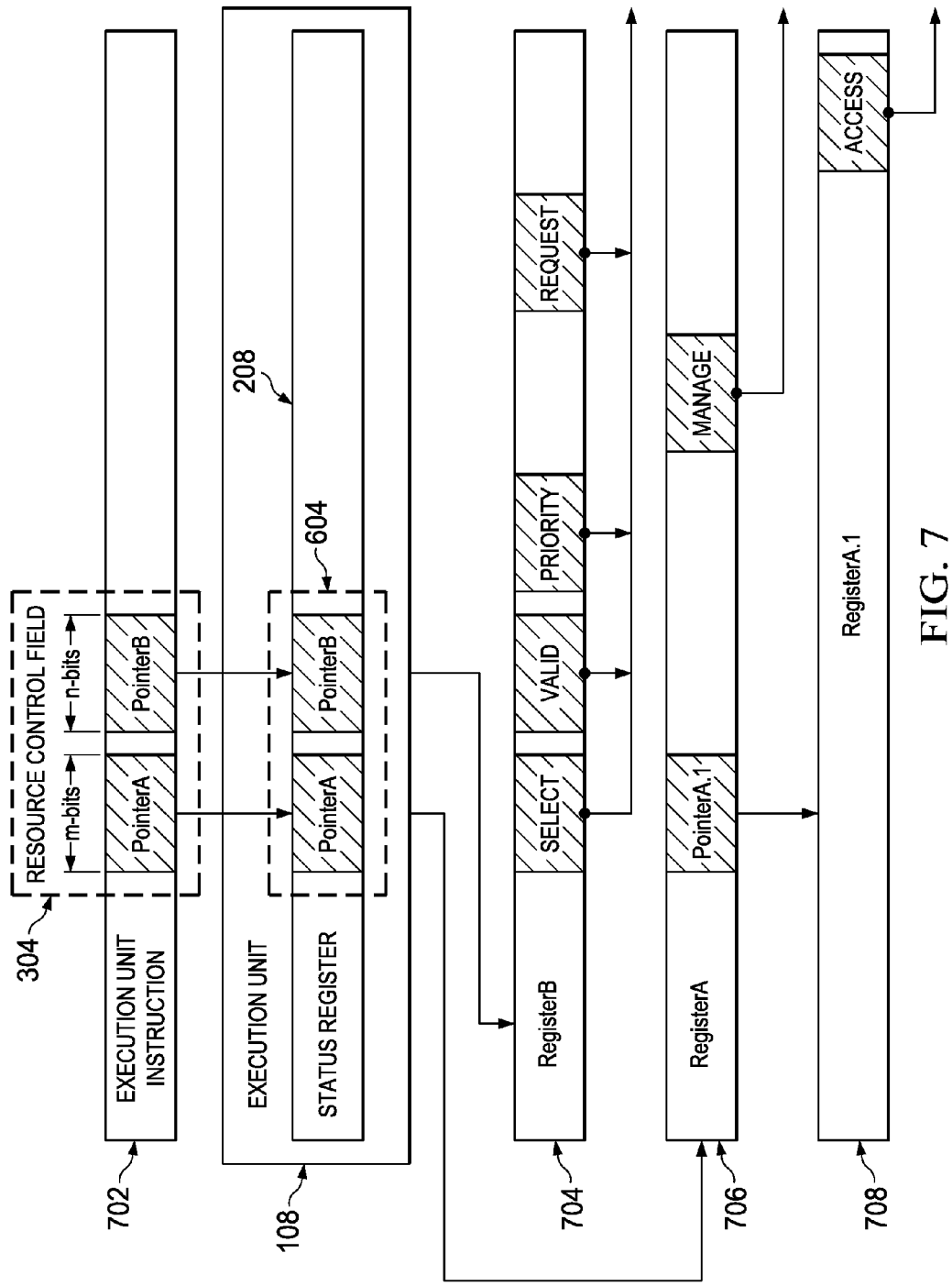
FIG. 7 shows application of indirectly referenced resource control information by an execution unit in accordance with various embodiments.

FIG. 7 shows application of indirectly referenced resource control information by an execution unit 108 in accordance with various embodiments. In FIG. 7, the Resource field 304 of instruction 702 includes pointers to storage locations containing resource control information. The pointers are transferred to the resource control field 604 of the status register 208. The resource control logic 214 may apply the pointers to access resource control information stored registers 704, 706. Memory may also be used to store indirectly referenced resource control information in some embodiments. Additionally, embodiments provide for multiple layers of indirection, as shown in FIG. 7, wherein a pointer value in an indirectly accessed register 706 references another register 708 containing additional resource control information.

Figure 8:
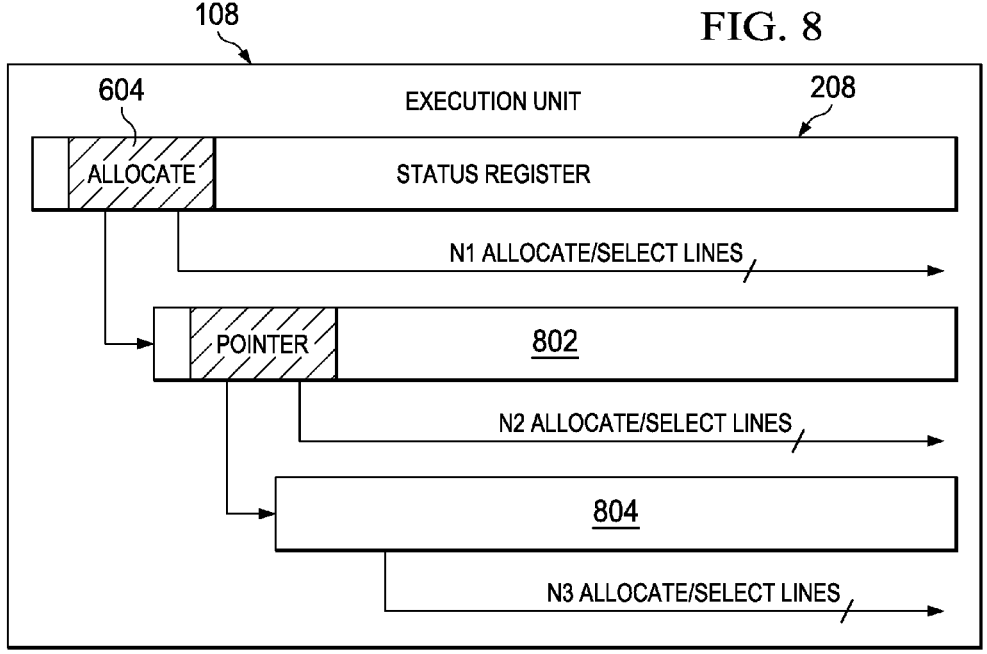
FIG. 8 shows an execution unit directly and indirectly applying resource control information to allocate processor resources in accordance with various embodiments.

FIG. 8 shows an execution unit 108 directly and indirectly applying resource control information to allocate processor resources in accordance with various embodiments. In FIG. 8, a first portion of the resource control information contained in the resource control field 604 may be directly applied to generation of resource allocation and/or control. A second portion of the resource control information contained in the resource control field 604 may be applied to indirectly access additional resource control information stored in registers/memory locations 802, 804. In this manner resource control lists may be formed that allow for control of any number of resources by an execution unit.

A status register 208 may include any number of resource control fields 604, where each field 604 contains resource control information applicable to different operational conditions. Selection of a resource control field 604, based on a change in operational conditions for example, may be software or hardware controlled.

Figure 9:
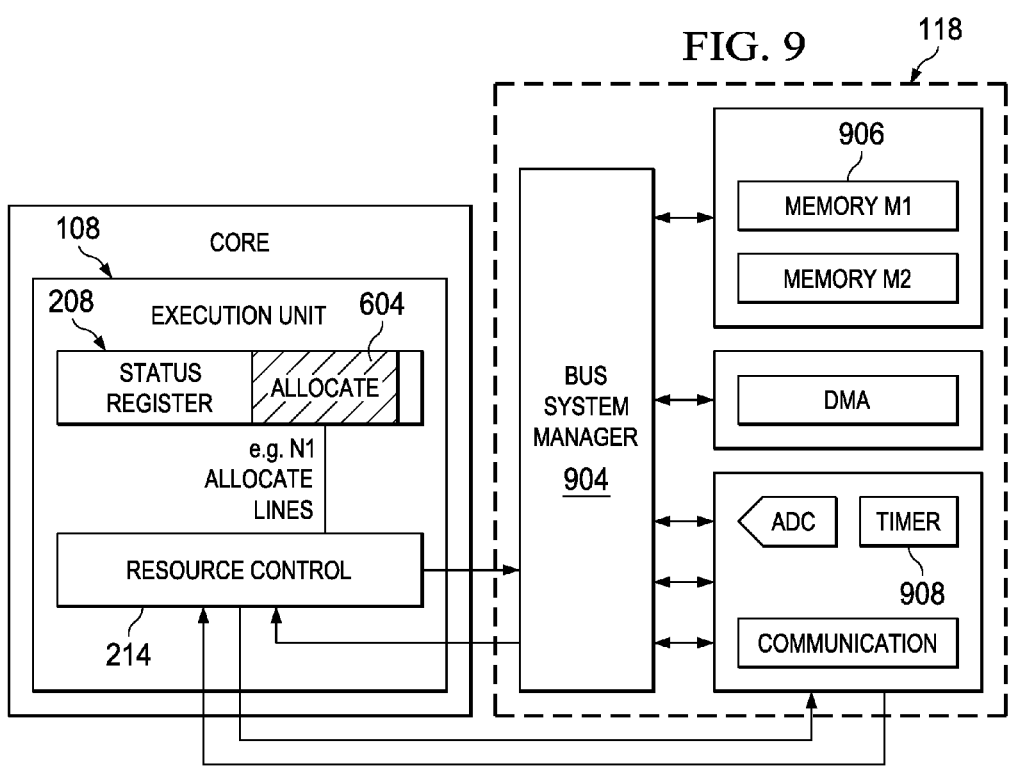
FIG. 9 shows an execution unit applying resource control information to allocate and/or control a variety of peripherals of a processor in accordance with various embodiments.

FIG. 9 shows an execution unit 108 applying resource control information to allocate and/or control a variety of peripherals of a processor in accordance with various embodiments. The resource control information is provided from the status register 208 to the resource control logic 214. The resource control logic 214 applies the resource control information to allocate and control peripheral devices 118. For example, the resource control logic 214 may allocate use of all or a portion of the bus system manager 904 or memory 906, while the remainder of the peripherals, execution units, etc. are maintained in a reduced power state. Allocation of the bus system manager 904 may provide for allocation of address, data, and/or control buses, extent of allocation (time or cycle based), portion/segment of bus allocated, etc. When the execution unit 108 has completed operations using the resource (e.g., memory 906), the resource may be released for use by a different execution unit, transitioned to a reduced power state, or remain allocated to the execution unit 108.

When requesting allocation of a resource, the resource may provide feedback indicating whether the resource can be presently allocated, indicating when the resource has been or will be allocated, indicating acceptable conditions of allocation, etc. For example, if execution units 102 and 108 concurrently wish to allocate use of memory 906, then the memory 906 will be allocated to one of the execution units and the other may be notified that allocation is delayed. In some embodiments, resource control information provided to the resource control logic 214 can change while a resource is allocated. In response to such a change, the resource control logic 214 can change the conditions of allocation (e.g., allocation time or termination conditions may change).

Allocation of resources can be immediate and unconditional, delayed, contingent, or delayed base on various conditions. For example, referring again to FIG. 9, allocation of the bus system manager 904 may be immediate, while allocation of the memory 906 may be delayed until the resource control logic 214 receives a signal (e.g., from timer 908) indicating the allocation is to be performed.

Because more than one execution unit can request access to a resource, embodiments of the processor 100 may resolve allocation in various ways. For example, a resource may be exclusively allocated to an execution unit for a specified time or until occurrence of a specified condition (e.g., operation completion). Alternatively, multiple execution units may share access to a resource where such sharing is not disruptive to operation. In some embodiments, the resources may dictate manner of allocation. In some embodiments, the processor 100 may include a system manager that resolves resource allocation requests from the execution units based on request/requestor priorities, predetermined allocation rules, etc. Alternatively, the resources themselves may make allocation determinations based on request/requestor priorities and/or predetermined allocation rules.

Embodiments may implement various methods for resolving resource allocation conflicts based on assigned priorities. An implemented priority method may determine which requestor gains access to a resource and determine what processor component determines how a resource is allocated. For example, a system manager, such as an operating system, may arrange allocation in accordance with requestor priority and/or arrange for allocation based requestor negotiation. Priority scheme resp. conflict solving scheme. In some such methods, allocation expects a resource to be in operational condition (e.g., powered, enabled, ready-to-start, active). Feedback of allocation results may be provided to requestors.

The above discussion is meant to be illustrative of the principles and various embodiments of the present invention. Numerous variations and modifications will become apparent to those skilled in the art once the above disclosure is fully appreciated. For example, while various operations and functions of the processor 100 have been described with reference to particular execution units, it is to be understood that the described operations and functions are not limited to any particular execution units. It is intended that the following claims be interpreted to embrace all such variations and modifications.

What is claimed is:

1. A processor, comprising:
   a processor core; and
   a peripheral;
   wherein the processor core comprises:
      a first execution unit; and
      a second execution unit coupled to the first execution unit;
   wherein the peripheral is coupled to the first execution unit and the second execution unit; and
   wherein the second execution unit is configured to execute a complex instruction, and comprises:
      a status register comprising a resource control field configured to store resource control information, wherein the resource control information specifies whether the second execution unit requests access to the peripheral during execution of an instruction sequence comprising a complex instruction; and
      resource control logic configured to apply the resource control information to request access to the peripheral during execution of the instruction sequence comprising the complex instruction.

2. The processor of claim 1, wherein the resource control information specifies whether the second execution unit requests access to a resource of the processor, wherein a resource is a hardware or software feature of the processor, and the resource control logic is configured to apply the resource control information to allocate the resource for use by the second execution unit during execution of the instruction sequence.

3. The processor of claim 1, wherein the processor comprises a system master configured to control allocation of resources to the second execution unit based on a request to access the resource by the second execution unit.

4. The processor of claim 3, wherein the system master is configured to resolve conflicting requests for allocation of a resource received from the second execution unit and a different source in the processor.

5. The processor of claim 1, wherein the second execution is configured to extract the resource control information from the complex instruction or from information provided to the second execution prior to execution of the complex instruction.

6. The processor of claim 1, wherein the resource control logic is configured to apply the resource control information to request access to the peripheral in conjunction with specified execution states of the complex instruction.

7. The processor of claim 1, wherein the resource control information is stored in the second execution unit prior to execution of an instruction during which the resource control signals are generated.

8. The processor of claim 1, wherein the resource control logic comprises a register accessible via instruction execution to allocate a resource of the processor for use by the second execution unit.

9. The processor of claim 1, wherein the resource control field specifies a location of the resource control information.

10. The processor of claim 1, wherein the resource control logic is configured to, based on the resource control information:
    identify a resource to be allocated;
    determine timing of allocation of the resource;
    determine timing of deallocation of the resource;
    determine duration of allocation of the resource;
    determine extent of the resource allocation to the second execution unit;
    determine conditions of operation of the resource;
    determine conditions under which the resource is to allocated; or
    determine conditions under which the resource is to be deallocated.

11. The processor of claim 1, wherein the resource control logic is configured to request allocation of at least a portion of the first execution unit based on the resource control information.

12. The processor of claim 1, wherein the second execution unit is configured to restore the resource control information to a pre-interruption value at completion of interrupt service processing by the second execution unit; wherein the interrupt service processing suspends execution of the complex instruction.

13. A processor, comprising:
    a processor core; and
    one or more peripherals;
    wherein the processor core comprises:
       a first execution unit; and
       a second execution unit coupled to the first execution unit;
    wherein the one or more peripherals are coupled to the first execution unit and the second execution unit; and
    wherein the second execution unit is configured to:
       execute a complex instruction;
       provide a plurality of concurrently active processing chains, each of the processing chains comprising execution of a complex processing instruction; and
       for each of the processing chains:
          initiate, in conjunction with execution of the complex signal processing instruction, allocation of at least one of the peripherals for use by the processing chain.

14. The processor of claim 13, wherein the second execution unit is configured to request allocation of at least a portion of the first execution unit in conjunction with execution of the complex signal processing instruction.

15. The processor of claim 13, wherein the processor comprises a system master configured to:
    control allocation of resources to the second execution unit based on a request to access the resource by the second execution unit;
    resolve conflicting requests for allocation of a resource received from the second execution unit and a different source in the processor; and
    report conflicting requests and an indication of the how the conflict was resolved to a management system of the processor.

16. The processor of claim 13, wherein the second execution unit comprises:
    a status register comprising a resource control field configured to store resource control information, wherein the resource control information specifies whether the second execution unit requests allocation of the at least one of the peripherals; and
    resource control logic configured to apply the resource control information to initiate the allocation.

17. The processor of claim 16, wherein the second execution unit is configured to restore the resource control information to a pre-interruption value at completion of interrupt service processing by the second execution unit.

18. The processor of claim 16, wherein the second execution unit is configured to extract the resource control information from the complex instruction or from information provided to the second execution prior to execution of the complex instruction.

19. The processor of claim 16, wherein the resource control field comprises a pointer that the resource control logic applies to identify the resource control information.

20. The processor of claim 16, wherein the resource control information specifies at least one of:
   identity of a resource to be allocated;
   timing of allocation of the resource;
   timing of deallocation of the resource;
   duration of allocation of the resource;
   extent of the resource allocation to the second execution unit;
   conditions of operation of the resource;
   conditions under which the resource is to allocated; and
   conditions under which the resource is to be deallocated.

21. A processor, comprising:
   a processor core; and
   one or more peripherals;
   wherein the processor core comprises:
      a first execution unit; and
      a second execution unit coupled to the first execution unit;
   wherein the one or more peripherals are coupled to the first execution unit and the second execution unit
   wherein the second execution unit comprises:
      a status register comprising a resource control field configured to store resource control information, wherein the resource control information specifies whether the second execution unit requests access to at least one of the peripherals; and
   wherein the second execution unit is configured to:
      execute a complex signal processing instruction;
      provide a plurality of concurrently active processing chains, each of the processing chains comprising execution of a complex processing instruction; and
      for each of the processing chains:
         the resource control logic is configured to initiate, in conjunction with execution of the complex processing instruction, allocation of at least one of the peripherals for use by the processing chain.

22. The processor of claim 21, wherein the resource control logic is configured to, based on the resource control information:
   identify of a resource to be allocated;
   determine when the resource is to be allocated;
   determine when the resource is to be deallocated
   determine duration of resource allocation;
   determine what portion of the resource is to allocated;
   determine conditions of operation of the resource;
   determine conditions under which the resource is to allocated; and
   determine conditions under which the resource is to be deallocated.

* * * * *